United States Patent Office 3,160,643
Patented Dec. 8, 1964

3,160,643
3-ENOL ETHERS OF 2-FORMYL-3-OXO-5α-STE-
ROIDS AND PROCESS FOR PREPARING SAME
Derek Burn, Bernard Ellis, and Vladimir Petrow, London,
England, assignors to The British Drug Houses Limited
No Drawing. Filed Jan. 24, 1963, Ser. No. 253,750
Claims priority, application Great Britain, Jan. 26, 1962,
3,001/62
21 Claims. (Cl. 260—397.4)

This invention is for improvements in or relating to organic compounds and has particular reference to a new group of steroidal materials comprising the 3-enol ethers of 2-formyl-3-oxo-5α-steroids.

It is an object of the present invention to provide a novel and efficient procedure for introducing a carbon atom onto the 2-methylene group adjacent to the 3-keto group of the steroid molecule yielding a new series of compounds which possess valuable biological properties or are intermediates for the preparation of compounds with valuable biological properties. Some of the 2-formyl derivatives (of Formula II below) which may be prepared by the process of the present invention possess marked claudogenic properties (V. Petrow, J. Pharm. Pharmacol, 1960, 12, 704) which render them of value in, for example, the veterinary field. Thus the 5α-dihydrocortisone derivatives inhibit implantation in the mouse. Compounds derived from androstanolone and 17α-alkylandrostanolones and particularly the 19-nor derivatives thereof have claudogenic properties. They also have ovulation inhibition activity. The 2-formyl group in the formyl derivatives (of Formula II may additionally be converted into a methyl group or may be condensed with aromatic amines or other carbonyl reagents yielding derivatives of value in the field of steroid technology. In addition, the 2-formyl derivatives (of Formula II may be condensed with such reagents as hydrazine or semicarbazide to yield pyrazolo-derivatives including Formula III

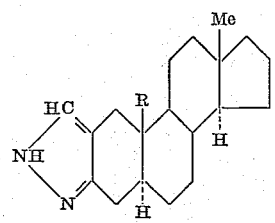

(III)

where R is H or Me and with hydroxylamine to yield oxazolo derivatives including Formula IV

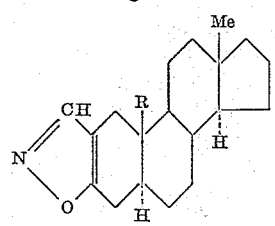

(IV)

where R is H or Me. Compounds of types (III) and (IV) are well established in the art on account of their valuable anabolic properties (Clinton, Manson, Stonner, Beyler, Potts and Arnold, J. Amer. Chem. Soc., 1959, 81, 1513; Clinton, Manson, Stonner, Christianson, Beyler, Potts and Arnold, J. Org. Chem. 1961, 26, 279).

The 2-formyl derivatives (of Formula II) may additionally be reduced to give 2-hydroxymethyl derivatives including Formula V

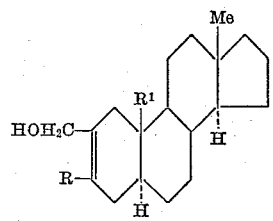

(V)

where R is as hereinafter defined and R¹ is H or Me, which compounds may be acylated, halogenated, oxidised and hydrogenated.

The present invention provides new 3-enol ethers of 2-formyl-3-oxo-5α-steroids including the Formula II below.

According to the present invention there is provided a process for the preparation of 3-enol ethers of 2-formyl-3-oxo-5α-steroids including the formula

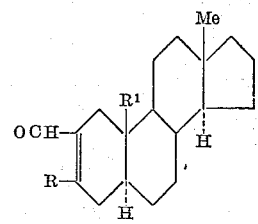

(II)

where R is O-alkyl, O-hydroxyalkyl, O-cycloalkyl or O-aralkyl and R¹ is H or Me which process comprises treating a corresponding 3-enol ether derived from a 3-oxo-5α-steroid saturated in Ring A including the formula

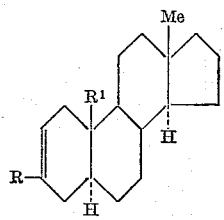

(I)

where R and R¹ have the same meaning as above with the Vilsmeier reagent folowed by hydrolysis.

The invention further provides a process for the preparation of 3-enol ethers of 2-formyl-3-oxo-5α-steroids including the Formula II above which process comprises treating a 3,3-dialkoxy-5α-steroid saturated in Ring A including the formula

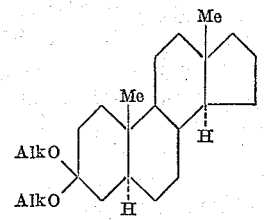

(VI)

with not less than 2 molar equivalents of the Vilsmeier reagent followed by hydrolysis.

The Vilsmeier reagent [see, for example, Houben-Weyl, Methoden der Organische Chemie, 4th Ed., 1954, Vol. 7(i), page 29 et seq.] is known to those skilled in the art as an extremely convenient reagent for introducing the formyl group into aromatic, quasi-aromatic and certain heterocyclic ring systems. Its present application to the 3-enolic ethers derived from 3-oxo-5α-steroids saturated in Ring A represents a new, important, highly unexpected and specific development of the art.

*Starting materials.*—The 3-enol ethers derived from 3- oxo-5α-steroids saturated in Ring A including Formula I form the starting materials of the present invention. They may be prepared by methods of prior art or as described below may be prepared and utilised in situ. Thus the 3-enol ethers may be prepared, inter alia, by such methods (of prior art) as (a) Conversion of the 3-oxo-5α-steroid saturated in Ring A into the 3,3-dialkoxy derivative including partial Formula VI followed by elimination of AlkOH by pyrolysis or other methods of prior art to yield the 3-enol ethers including Formula I, (b) Treatment of the 3,3-dialkoxy derivative including partial Formula VI with the Vilsmeier reagent when the corresponding 3-enol ether including Formula I is obtained. Such enol ethers need not be isolated but may be formylated in situ with a further quantity of the Vilsmeier reagent to yield the formyl derivatives including Formula II, (c) Treatment of an 3,3-alkylenedioxy derivative including partial Formula VII

(VII)

with the Vilsmeier reagent when the corresponding O-hydroxyalkyl enol ether including Formula I (where R=O-hydroxyalkyl) is obtained. Such enol ethers need not be isolated, but may be formaylated in situ with a further quantity of the Vilsmeier reagent to yield the formyl derivative including Formula II (where R=O-hydroxyalkyl), (d) In the case of the 3-enol ethers of 3-oxo-androstane, 19-norandrostane, 5α-pregnane, 5α-19-norpregnane, cholestane, spirostane, ergostane, stigmastane and derivatives and analogues thereof, the required 3-enol ethers may be prepared from the corresponding 3-oxo-Δ⁴-steroids by conversion into the 3,5-dienic-3-enol ethers including partial Formula VIII (where R is as hereinabove defined)

(VIII)

followed by catalytic hydrogenation of the 3,5-dienic 3-enol ethers including partial Formula VIII when the 3-enol ethers of the Ring A saturated 5α-steroids including Formula I are obtained.

*Vilsmeier reagent.*—The Vilsmeier reagent is generally understood to be a reactant formed from a formylated secondary amine and an acid halide selected from the group comprising those acid halides which readily undergo nucleophilic displacement of a halide ion on treatment with the N-formyl derivative of a secondary amine [see, for example, Bosshard and Zollinger, Helv. Chim. Acta, 1959, 42, 1659].

Various formamides such as dimethylformamide
    diethylformamide
    methylphenylformamide
    ethylphenylformamide
    formylpiperidine
    formylmorpholine
    methylethylformamide may be employed. Dimethylformamide is the preferred formamide.

In addition to phosphorus oxychloride and phosgene, other acidic reagents such as phosphorus oxybromide and pentachloride may be employed. Thionyl chloride, oxalylchloride and similar acid halides may also be used. Phosgene is the preferred reagent.

*Preferred procedure for preparing the 2-formyl derivative.*—As stated hereinabove, ketalic derivatives such as (VI) and (VII) are preferred as starting materials as they are generally more readily accessible than the corresponding Δ²-enol ethers such as (I) and additionally are so readily converted in situ into the desired Δ²-enol ethers such as (I) by reaction with the Vilsmeier reagent. In employing them as starting materials it will of course be necessary to use $\ll$ 2 molar equivalents of the Vilsmeier reagent. When Δ²-enol ethers such as (I) are employed as starting materials, however, it will in general be necessary to use $\ll$ 1 molar equivalent of the Vilsmeier reagent.

The following experimental conditions are preferred for converting Δ²-enol ethers such as (I) into the 2-formyl derivatives. When ketalic derivatives such as (VI) and (VII) are employed, the quantity of phosgene used will be increased accordingly to $\ll$ 2 molar equivalents.

Phosgene (generally about one mole) either directly or in solution in an anhydrous non-hydroxylic organic solvent, which may be dioxan or preferably a halogenated hydrocarbon solvent such as methylene dichloride, chloroform, carbon tetrachloride or ethylene dichloride is added at 0° C. to a solution of dimethylformamide, preferably in one of the foregoing chlorinated hydrocarbons or in dioxan, when formation of the Vilsmeier reagent occurs. It is preferable at this stage to obtain a reagent free from excess phosgene by ensuring the presence of not less than an equivalent quantity of dimethylformamide and to prepare it under essentially anhydrous conditions.

The steroidal ether, either in solution (preferably in one of the foregoing halogenated solvents or in dioxan) or in the finely-powdered state, is then added at 0° C. to the prepared Vilsmeier reagent. The mixture is preferably stirred, moisture is excluded, and the reaction allowed to proceed spontaneously, when darkening of the solution occurs and the temperature of the mixture rises. In general, in working with small batches of material, external cooling is not necessary, but such cooling may become desirable when the scale of the reaction is increased. Reaction is generally complete in 1 to 3 hours. The mixture is then poured into aqueous methanolic sodium acetate solution to decompose the complex and the product isolated from the organic solvent layer.

*Scope of the 2-formylation reaction.*—The 2-formylation reaction is applicable to enolic derivatives including Formula I which may additionally contain further substituents as indicated below:

*Hydroxyl groups.*—The Vilsmeier reagent is known by prior art to formylate or replace by halogen free hydroxyl groups (see Houben Weyl, loc. cit.). It may be advantageous, therefore, to protect hydroxyl groups by acylation and subsequently regenerate them by hydrolysis or hydrogenolysis if so desired. This is particularly desirable in the case of 17α-substituted-17β-hydroxy derivatives.

Hydroxyl groups at $C_1$, $C_2$ and $C_4$ interfere with the Vilsmeier reaction. Hydoxyl groups and functional derivatives thereof, in such positions as 5, 6, 11, 12, 15, 16 (including 16-hydroxy methyl), 17, 18, 20 and 21 (including the condensation products of 16α,17α-glycols with carbonyl components), however, generally permit formylation at $C_2$ to take place. Thiol groups at $C_{16}$ are unaffected.

*Carbonyl groups.*—Carbonyl groups such, for example, as carbonyl groups at 11, 12, 16, 17, 18 and 20, normally do not interfere with the formylation procedure.

*Carbalkoxy groups.*—Carbalkoxy groups at $C_{13}$, $C_{16}$ and $C_{17}$, or in the sidechain do not interfere with the formylation procedure. Cyano-groups at $C_{13}$, $C_{16}$ and $C_{17}$ likewise permit normal $C_2$ formylation to occur.

*Alkyl groups.*—Alkyl groups other than at $C_2$ and in particular alkyl groups at $C_4$, $C_5$, $C_6$, $C_{11}$, $C_{16}$, $C_{17}$ and $C_{21}$ containing up to 6 carbon atoms do not interfere with the process of the invention.

*Alkenyl groups.*—Vinyl and allyl groups at $C_{17}$ do not interfere with the process of the invention.

*Methylene and ethylidene groups.*—Such groups at positions 6, 11, 16(17), 16 and 17 do not interfere with the process of the invention.

*Lactone, ether and spiroketal residues.*—Spirolactone residues such as —O.CO.CH$_2$.CH$_2$— attached to $C_{17}$, etheric groups at $C_{16}$, and bridging $C_{18}$ and $C_{20}$, spiroketal moieties such as are present in diosgenone, do not interfere with the process of the invention.

*Halogen groups.*—Chlorine, bromine or fluorine substituents in Rings C and D or in the side-chain do not interfere with the process of the invention.

*Unsaturated linkages.*—Unsaturated linkages at $C_{9(11)}$, $C_{11}$, $C_{14}$, $C_{16}$ and $C_{17(20)}$ do not interfere with the process of the invention.

*Ketol groups.*—Ketol groups at $C_{16}$—$C_{17}$, $C_{17}$—$C_{20}$ and $C_{20}$—$C_{21}$ are preferably acylated prior to reaction with the Vilsmeier reagent.

*Corticoid sidechain.*—The corticoid sidechain may be protected by acylation at $C_{21}$, by reaction with formaldehyde to give the bis-methylenedioxy derivative, by forming the $C_{17}$-$C_{21}$ cyclic carbonate or acetonide or by other methods known to those skilled in the art, and subsequently regenerated as desired.

*Epoxides.*—16β-Methyl-16α, 17α-epoxypregnan-20-one derivatives may be converted in one operation into the corresponding 2-formyl derivatives of 17α-hydroxy-16-methylenepregnan-20-one by using approximately extra mole proportions of the Vilsmeier reagent. 16α,17α-Epoxypregnan-20-one residues are converted into 16β-halo-17α-hydroxypregnan-20-one structures.

The following 3-oxo-5α-steroids and 19-nor analogues thereof and their acyl and other derivatives (such as bis-methylenedioxy derivatives in the case of corticoids, acetonides and in the case of cis-α-glycols and ethers in the case of alcohols) thereof may be submitted to the process of the invention.

5α-androstane-3,17-dione and its 6- and 16-methyl derivatives, 6 and 11-methylene derivatives and the 11-oxo-11-hydroxy- and 9(11)-dehydro derivatives thereof.

17β-hydroxy-5α-androstan-3-one and its 6-methyl derivatives and the 11-oxo-11-hydroxy- and 9(11)-dehydro derivatives thereof.

17α - alkyl - 17β-hydroxy-5α-androstan-3-ones (wherein the alkyl group contains up to 4 carbon atoms) and its 6-methyl derivatives and the 11-oxo- 11-hydroxy and 9(11)-dehydro derivatives thereof.

17α - alkyl-17β-hydroxy-5α-androstan-3-ones (wherein the alkyl group contains up to 4 carbon atoms).

17α-alkylnyl-17β-hydroxy-5α-androstan-3-ones (wherein the alkynyl group contains up to 5 carbon atoms).

5α-pregnane-3,20-dione and its 6 and 16-methyl derivatives and the 11-oxo, 11-hydroxy and 9(11)-dehydro derivatives thereof.

17α-acetoxy-5α-pregnane-3,20-dione and the 6- and 16-methyl and 16-methylene derivatives and the 11-oxo, 11-hydroxy and 9(11)-dehydro derivatives thereof.

17α-acetoxy-21-fluro-5α-pregnane-3,20-dione and the 6 and 16-methyl and 16-methylene derivatives and the 11-oxo, 11-hydroxy and 9(11)-dehydro derivatives thereof.

5α-dihydro cortisone and hydrocortisone and the 6-methyl, 16-methyl, 16-methylene, 16α-hydroxy derivatives thereof.

16α,17α - isopropylidenedioxy - 5α-pregnane-3,20-dione and the 6-methyl derivative and the 11-oxo, 11-hydroxy and 9(11)-dehydro derivatives thereof.

5α-dihydro-compound S and the 6-methyl, 16-methyl, 16-methylene, 16-hydroxy derivatives and the 9(11)-dehydro derivatives thereof.

3 - (3 - oxo-17β-hydroxy-5α-androst-17α-yl)-propionic acid and lactone and the 11-oxo, 11-hydroxy and 9(11)-dehydro derivatives thereof.

5α-dihydrotestololactone.

3-oxo-5α-pregn-17-enoic acid (esters) and the 6-methyl derivative and the 11-oxo, 11-hydroxy- and 9(11)-dehydro derivatives thereof.

It will be seen that the 3-enol ethers of the 2-formyl-3-oxo-5α-steroids derived from the compounds named above, comprise compounds of the general formula:

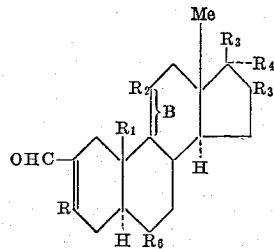

wherein

R is O-alkyl, O-hydroxyalkyl, O-cycloalkyl or O-aralkyl
$R_1$ is hydrogen, or methyl
$R_2$ is hydrogen, oxo, or hydroxy
$R_3$ is —OH, —COCH$_3$, —COCH$_2$F, —COCH$_2$OH or —COCH$_2$OAc
$R_4$ is – –H, – –lower alkyl, or – –lower alkynyl when $R_3$ is —OH and is – –H, – –OH or – –OAc when $R_3$ is —COCH$_3$, COCH$_2$F, —COCH$_2$OH or —COCH$_2$OAc
$R_3$ and $R_4$ together may be oxo or —O.CO.CH$_2$.CH$_2$— —
$R_5$ is hydrogen, methyl, methylene or hydroxyl
$R_4$ and $R_5$ together may be

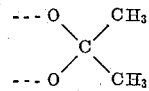

$R_6$ is hydrogen or methyl, and
B is a single bond when $R_2$ is oxo or hydroxy and is either a single or double bond when $R_2$ is hydrogen.

Following is a description by way of example of methods of carrying the invention into effect.

EXAMPLE 1

*Preparation of 17α-Acetoxy-2-Formyl-3-Methoxy-5α-Pregn-2-En-20-One*

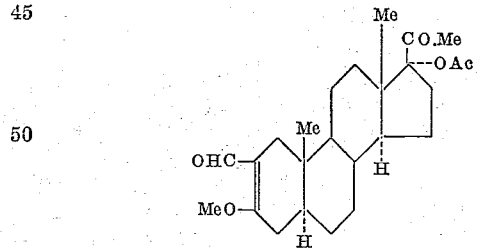

(*a*) A solution of 17α-acetoxy-3,3-dimethoxy-5α-pregnan-20-one [5.5 g. M.P. 190 to 191° C., needles, $[\alpha]_D^{26}$—4.0 (c, 0.97 in dioxan) prepared from the corresponding 3-ketone by treatment with methanol containing a trace of oxalic acid] in dry ethylenedichloride (100 ml.) containing a trace of pyridine was added at 0° C. with stirring to a suspension of the complex prepared from dimethylformamide (3.3 ml.) and phosgene (1.9 g.) in dry ethylenedichloride (30 ml.) and the mixture was allowed to warm to room temperature over 3 hours. A solution of sodium acetate (7.5 g.) in methanol (50 ml.) and water (10 ml.) was added, stirring was continued for a further ½ hour, the mixture was poured into water, washed and dried (Na$_2$SO$_4$) extract yielded a gummy residue which crystallised from dichloromethane/methanol to give 17α-acetoxy-2-formyl-3-methoxy-5α-pregn-2-en-20-one as plates, M.P. 247 to 250° C., $[\alpha]_D^{25}+79.4°$ (c, 1.2 in chloroform), $\lambda_{max.}^{EtOH}$ 279 mμ ( $\epsilon$ 13,910)

EXAMPLE 2

*Preparation of 17α-Acetoxy-2-Formyl-3-Methoxy-5α-Pregn-2-En-20-One*

17α - acetoxy - 3-methoxy-5α-pregn-2-en-20-one [M.P. 182 to 184° C., $[\alpha]_D^{21.5}+39.5°$ (c, 0.7 in dioxan)], prepared either by pyrolysis of 17α-acetoxy-3,3-dimethoxy-5α-pregnan-20-one or by catalytic hydrogenation of 17α-acetoxy-3-methoxypregna-3,5-dien-20-one, was treated by the process of Example 1 using half the quantity of phosgene to give 17α-acetoxy-2-formyl-3-methoxy-5α-pregn-2-en-20-one, M.P. 248 to 250° C., identical in every respect with the compound obtained as described in Example 1.

EXAMPLE 3

*Preparation of 17β-Acetoxy-2-Formyl-3-Methoxy-17α-Methyl-5α-Androst-2-Ene*

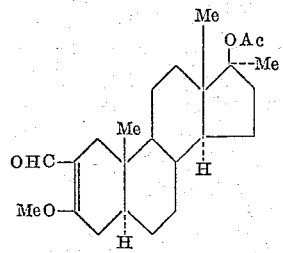

A solution of 17α-methyl-5α-androstan-17β-ol-3-one (1 g.) [Rusicka, Meister and Prelog, Helv. Chim. Acta, 1947, 30, 867] and selenium dioxide (1 g.) in methanol (80 ml.) was heated under reflux for 1 hour, cooled, and a solution of potassium hydroxide (1 g.) in methanol (30 ml.) added. Water (500 ml.) was added, the product filtered off and recrystallised from aqueous methanol to give 3,3 - dimethoxy - 17α - methyl-5α-androstan-17β-ol, tablets M.P. 154 to 157° C., $\gamma_{max.}^{Nujol}$ 1180, 1145, 1100 and 1040 cm.$^{-1}$ A solution of the foregoing compound (3 g.) in acetic anhydride (30 ml.) and pyridine (30 ml.) was boiled under reflux for 3 hours, cooled and poured into water (250 ml.). The product was extracted with benzene, the extract dried (Na$_2$SO$_4$), filtered through a short column of alumina and the solvent evaporated. Crystallisation of the residue from aqueous methanol (containing a trace of pyridine) gave 17β-acetoxy-3,3-dimethoxy-17α-methyl-5α-androstane, plates, M.P. 114 to 116° C., $[\alpha]_D^{21}+7$ (c, 0.62 in chloroform).

The foregoing compound (1 g.) was added to a stirred ice-cooled suspension of the Vilsmeier reagent [prepared by the addition of a solution of phosgene in ethylene dichloride (10% w./v. 7 ml.) to a solution of dimethylformamide (1.2 ml.) in ethylene dichloride (10 ml.)] and the mixture stirred at room temperature for 1 hour. The mixture was hydrolysed with aqueous methanolic sodium acetate and the product isolated with ether. Crystallisation of the product from aqueous methanol gave 17β - acetoxy - 2-formyl-3-methoxy-17α-methyl-5α-androst-2-ene, needles M.P. 182 to 183° C., $[\alpha]_D^{24}+95°$ (c, 0.82 in chloroform), $\gamma_{max.}^{Nujol}$ 1730, 1650 and 1610 cm.$^{-1}$

EXAMPLE 4

*Preparation of 21-Acetoxy-2-Formyl-17α-Hydroxy-3-Methoxy-5α-Pregn-2-Ene-11,20-Dione*

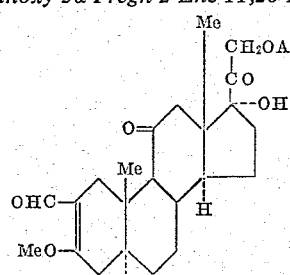

A suspension of 21-acetoxy - 3,3 - dimethoxy - 17α-hydroxy-5α - pregnane - 11,20 - dione (Evans, Green, Hunt, Long, Mooney and Phillipp J.C.S., 1958, 1529) (10.5 g.) in dry ethylenedichloride (75 ml.) was added with stirring to a cooled suspension of the complex prepared from phosgene (5 g.) and dimethylformamide (5 g.) in dry ethylenedichloride (75 ml.) and the mixture was allowed to warm to room temperature over 4 hours. A solution of sodium acetate (10 g.) in methanol (75 ml.) was added and stirring was continued for a further ½ hour. The mixture was poured into water and the steroid was extracted into ether. Evaporation of the water-washed and dried extract left a residue which was crystallised from dichloromethane/methanol to give 21-acetoxy-2-formyl-17α-hydroxy-3-methoxy-5α-pregn-2-ene - 11,20 - dione as plates, M.P. 263 to 265° C., $[\alpha]_D^{26}+151°$ (c., 1.0 in pyridine), $\lambda_{max.}^{EtOH}$ 278.5 m$\mu$ ($\epsilon$ 13,790)

EXAMPLE 5

*Preparation of 17β-Acetoxy-3-(2'-Formoxyethoxy)-2-Formyl-Androst-2-Ene*

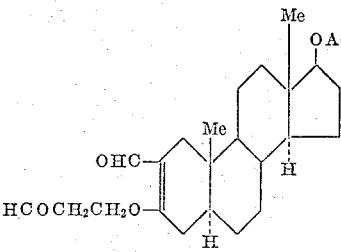

17β-acetoxy-3,3 - ethylenedioxy-5α - androstane (1.5 g. M.P. 140.5 to 141.5° C.) was added to an ice-cooled stirred suspension of the Vilsmeier reagent [prepared from solutions of dimethylformamide (1.5 ml.) in ethylene dichloride (10 ml.) and phosgene in ethylene dichloride (10%, 10 ml.)]. The mixture was stirred for 1 hour, allowed to stand for 16 hours at room temperature, then hydrolysed with aqueous methanolic sodium acetate solution. The product was isolated with ether as a pale yellow solid. Recrystallisation from ethanol gave 17β-acetoxy-3-(2'-formoxyethoxy)-2 - formylandrost - 2 - ene, as prisms, M.P. 200 to 201° C., $[\alpha]_D^{25}+81°$ (c., 0.89 in chloroform)

$\lambda_{max.}^{EtOH}$ 274 m$\mu$ ($\epsilon$ 12,960) $\gamma_{max.}^{Nujol}$ 1720, 1645 and 1610 cm.$^{-1}$

EXAMPLE 6

*Preparation of 17β-Acetoxy-2-Formyl-3-Methoxy-19-Nor-5α-Androst-2-Ene*

A solution of 17β-hydroxy-19-nor-5α-androstan-3-one (5 g.) [Bowers, Ringold and Denot, J. Amer. Chem. Soc., 1958, 80, 6115] in acetic anhydride (50 ml.) and pyridine (50 ml.) was heated on a steam bath for 1 hour. The mixture was cooled poured into water (1 l.) and the precipitated solid filtered off and washed with water. Recrystallisation of the product from aqueous methanol gave 17β-acetoxy-19-nor-5α-androstan-3-one, prisms, M.P. 98–100° C.

A solution of the foregoing compound (4.2 g.) and oxalic acid (500 mg.) in methanol (100 ml.) was heated under reflux for 2 hours, cooled and pyridine (5 ml.) added. The mixture was poured into water (500 ml.) and the product isolated with ether. Crystallisation of the product from aqueous methanol containing a trace of pyridine gave 17β-acetoxy-3,3-dimethoxy-19-nor-5α-androstane, prisms, M.P. 111–113° C., $[\alpha]_D^{17}+14.8°$ (c., 1.01 in chloroform), $\gamma_{max.}^{Nujol}$ 1730 cm.$^{-1}$ The foregoing compound (300 mg.) was added to a stirred, ice-cooled suspension of the Vilsmeier reagent [prepared by addition of a solution of phosgene in ethylene dichloride (10% w./v., 5.5 ml.) to a solution of dimethyl formamide (1 ml.) in ethylene dichloride (3 ml.)] and the mixture stirred at room temperature for 2 hours. The mixture was hydrolysed with aqueous methanolic sodium acetate solution and the product isolated with ether. Crystallisation of the product from aqueous methanol gave 17β-acetoxy-2-formyl-3-methoxy-19-nor-5α-androst-2-ene, plates, M.P. 188–190° C., $[\alpha]_D^{20}+148°$ (c., 1.03 in chloroform), $\gamma_{max.}^{Nujol}$ 1730, 1650 and 1610 cm.$^{-1}$

EXAMPLE 7

*Preparation of 21-Acetoxy-2-Formyl-17α-Hydroxy-3-Methoxy-5α-Pregn-2-En-20-One*

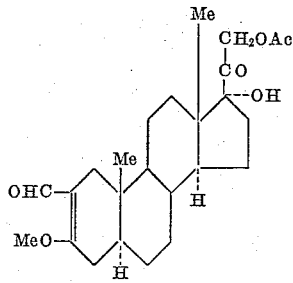

A solution of 21-acetoxy-17α-hydroxy-5α-pregna-3,20-dione [5 g. (Rosenkranz and Pataki, U.S.P. 2,596,562)] and oxalic acid (200 mg.) in methanol (100 ml.) was boiled under reflux for 3 hours. The mixture was cooled, treated with pyridine, poured into water (1.1) and the product isolated with ether. Crystallisation gave 21-acetoxy-17α-hydroxy-3,3-dimethoxy-5α-pregnan-20-one.

The foregoing compound (1 g.) was added to a stirred ice-cooled suspension of the Vilsmeier reagent [prepared by the addition of a solution of phosgene in ethylene dichloride (10% w./v., 7 ml.) to a solution of dimethylformamide (1.2 ml.) in ethylene dichloride (10 ml.)] and the mixture stirred at room temperature for 1 hour. The mixture was hydrolysed with aqueous methanolic sodium acetate and the product isolated with ether. Crystallisation of the product gave 21-acetoxy-2-formyl-17α-hydroxy-3-methoxy-5α-pregn-2-en-20-one, $\lambda_{max.}^{EtOH}$ 279 mμ ($\epsilon$ 13,200), $\gamma_{max.}^{Nujol}$ 1740, 1730, 1650 and 1610 cm.$^{-1}$

EXAMPLE 8

*Preparation of 21-Acetoxy-2-Formyl-17α-Hydroxy-3-Methoxy-16β-Methyl-5α-Pregn-2-En-11,20-Dione*

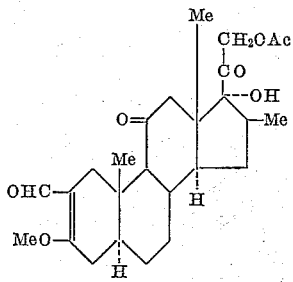

A solution of 21-acetoxy-17α-hydroxy-16β-methyl-5α-pregna-3,11,20-trione [5 g. (Nathansohn, Winters and Testa, Experientia 1961, 17, 448)] and oxalic acid (200 mg.) in methanol (100 ml.) was heated under reflux for 2 hours. The mixture was cooled, treated with pyridine (5 ml.) and poured into water (1 l.). The product was isolated with ether and crystallised to give 21-acetoxy-17α-hydroxy-3,3-dimethoxy-16β-methyl-5α-pregna-11,20-dione.

The foregoing compound (3 g.) was added to a stirred, ice-cooled suspension of the Vilsmeier reagent [prepared by the addition of a solution of phosgene in ethylene dichloride (10% w./v., 21 ml.) to a solution of dimethylformamide (3.6 g.) in ethylene dichloride (30 ml.)] and the mixture stirred at room temperature for 2 hours. The mixture was hydrolysed with aqueous methanolic sodium acetate and the product isolated with ether. Crystallisation of the product gave 21-acetoxy-2-formyl-17α-hydroxy-3-methoxy-16β-methyl-5α-pregn-2-en-11,20-dione, $\lambda_{max.}^{EtOH}$ 279 mμ ($\epsilon$ 13,500), $\gamma_{max.}^{Nujol}$ 1740, 1730, 1705, 1650 and 1610 cm.$^{-1}$

EXAMPLE 9

*Preparation of 2-Formyl-17α-Hydroxy-3-Methoxy-16α-Methyl-5α-Pregn-2-En-11,20-Dione*

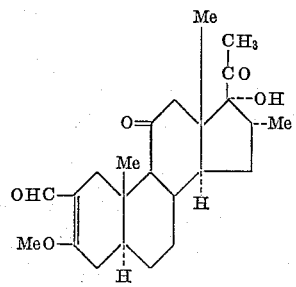

A solution of 17α-hydroxy-16α-methyl-5α-pregna-3,11,20-trione [2.5 g. (Heusler, Kebole, Meystre, Ueberwasser, Wieland, Anner and Wettstein, Helv. Chim. Acta, 1959, 42, 2043)] and oxalic acid (100 mg.) in methanol (40 ml.) was heated under reflux for 4 hours, cooled and treated with pyridine (3 ml.). The mixture was poured into water (500 ml.), the product isolated with ether and crystallised to give 17α-hydroxy-3,3-dimethoxy-16α-methyl-5α-pregn-11,20-dione, $\gamma_{max.}^{Nujol}$ 1730, 1705 cm.$^{-1}$ A solution of the foregoing dimethoxy compound (500 mg.) in ethylene dichloride (5 ml.) was added to a stirred ice-cooled suspension of the Vilsmeier reagent [prepared by the addition of a solution of phosgene in ethylene dichloride (10% w./v., 3.5 ml.) to a solution of dimethylformamide (0.6 ml.) in ethylene dichloride (5 ml.)] and the mixture stirred at room temperature for 1 hour. The mixture was hydrolysed with aqueous methanolic sodium acetate and the product isolated with ether. Crystallisation of the product gave 2-formyl-17α-hydroxy-3-methoxy-16α-methyl-5α-pregn-2-en-11,20-dione, $\lambda_{max.}^{EtOH}$ 278.5 mμ ($\epsilon$ 13,650), $\gamma_{max.}^{Nujol}$ 1730, 1705, 1650, 1610 cm.$^{-1}$

EXAMPLE 10

*Preparation of 21-Acetoxy-2-Formyl-17α-Hydroxy-3-Methoxy-16α-Methyl-5α-Pregna-2,9(11)-Dien-20-One*

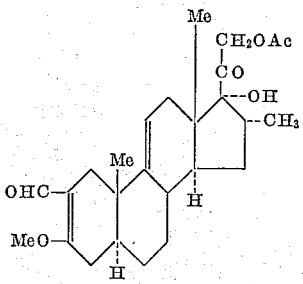

A solution of 21-acetoxy-17α-hydroxy-16α-methyl-5α-pregn-9(11)-en-3,20-dione (3.7 g.) (Ehrmann, Heusler, Meystre, Wieland and Wettstein, Helv. Chim. Acta, 1959, 42, 2548) and oxalic acid (100 mg.) in methanol (50 ml.) was heated under reflux for 2½ hours. The mixture was cooled, treated with pyridine (5 ml.) and poured into water (500 ml.). The product was isolated with ether and crystallised to give 21-acetoxy-17α-hydroxy-3,3-dimethoxy-16α-methyl-5α-pregn-9(11)-en-20-one.

The foregoing compound (1.5 g.) was added to a stirred ice-cooled suspension of the Vilsmeier reagent [prepared by the addition of a solution of phosgene in ethylene dichloride (10% w./v., 10.5 ml.) to a solution of dimethylformamide (1.8 ml.) in ethylene dichloride (10 ml.)] and the mixture stirred at room temperature for 1½ hours. The mixture was hydrolysed with aqueous methanolic sodium acetate and the product isolated with ether. The product was crystallised to give 21-acetoxy - 2 - formyl-17α-hydroxy-3-methoxy-16α-methyl-5α-pregna-2,9(11)-dien-20-one, $\lambda_{max.}^{EtOH}$ 279 m$\mu$ ($\epsilon$ 13,800), $\gamma_{max.}^{Nujol}$ 1735, 1725, 1650, 1610 cm$^{-1}$

EXAMPLE 11

*Preparation of 17β-Acetoxy-2-Formyl-3-Methoxy-16β-Methyl-5α-Androst-2-Ene*

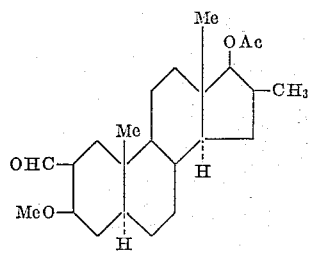

A solution of 17β-acetoxy-16β-methyl-5α-androstan-3-one (10 g.) (Rugguieri, Ferrari and Gandolgi, Gazz. Chim. Ital. 1961, 91, 686) and oxalic acid (250 mg.) in methanol (150 ml.) was heated under reflux for 3 hours. The mixture was cooled, pyridine (5 ml.) added and the mixture poured into water (1.2.1.). The product was isolated with ether and recrystallised to give 17α-acetoxy-3,3-dimethoxy-16β-methyl-5α-androstane, $\gamma_{max.}^{Nujol}$ 1735 cm.$^{-1}$ A solution of the foregoing compound (5 g.) in ethylene dichloride (50 ml.) was added to a stirred, ice-cooled suspension of the Vilsmeier reagent [prepared by the addition of a solution of phosgene in ethylene dichloride (10% w./v., 35 ml.) to a solution of dimethylformamide (6 ml.) in ethylene dichloride (50 ml.)] and the mixture stirred at room temperature for 1 hour. The mixture was hydrolysed with aqueous methanolic sodium acetate and the product isolated with ether. Crystallisation of the product gave 17β-acetoxy-2-formyl-3-methoxy-16β-methyl-5α-androst-2-en, $\lambda_{max.}^{EtOH}$ 279 m$\mu$ ($\epsilon$ 13,900) $\gamma_{max.}^{Nujol}$ 1735, 1650, 1610 cm.$^{-1}$.

EXAMPLE 12

*Preparation of 17β-Acetoxy-2-Formyl-3-Methoxy-17α-Methyl-19-Nor-5α-Androst-2-Ene*

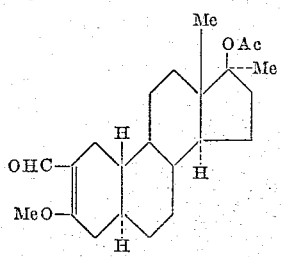

A solution of 17β-hydroxy-17α-methyl-19-nor-5α-androstan-3-one (5 g.) (Bowers, Ringold and Dorfman, J. Amer. Chem. Soc., 1957, 79, 4557) in acetic anhydride (50 ml.) and pyridine (50 ml.) was heated under reflux for 4 hours. The mixture was cooled, poured into water and the product isolated with ether. Crystallisation gave 17β-acetoxy-17α-methyl-19-nor-5α-androstan-3-one, $\gamma_{max.}^{Nujol}$ 1735, 1710 cm.$^{-1}$ A solution of the foregoing compound (2.9 g.) and oxalic acid (100 mg.) in methanol (50 ml.) was boiled under reflux for 3 hours. The mixture was cooled, treated with pyridine (5 ml.) and poured into water (500 ml.). The product was isolated with ether and crystallised to give 17β - acetoxy - 3,3-dimethoxy-17α-methyl-19-nor-5α-androstane $\gamma_{max.}^{Nujol}$ 1735 cm.$^{-1}$ The foregoing compound (1 g.) was added to a stirred ice-cooled suspension of the Vilsmeier reagent [prepared by the addition of a solution of phosgene (10% w./v., 7 ml.) to a solution of dimethylformamide (1.2 ml.) in ethylene dichloride (5 ml.)] and the mixture stirred at room temperature for 2 hours. The mixture was hydrolysed with aqueous methanolic sodium acetate and the product isolated with ether. Crystallisation of the product gave 17β-acetoxy - 2 - formyl - 3 - methoxy-17α-methyl-19-nor-5α-androst-2-ene $\lambda_{max.}^{EtOH}$ 279.5 m$\mu$ ($\epsilon$ 12,900), $\gamma_{max.}^{Nujol}$ 1735, 1650, 1610 cm.$^{-1}$

EXAMPLE 13

*Preparation of 17β-Acetoxy-2-Formyl-3-Methoxy-6α,17α-Dimethyl-5α-Androst-2-Ene*

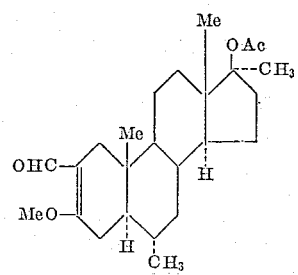

A solution of 6α,17α-dimethyl-5α-androstan-17β-ol-3-one (5.6 g.) (U.S.P. 2,936,312) in pyridine (50 ml.) and acetic anhydride (50 ml.) was heated under reflux for 4 hours. The mixture was cooled, poured into water (1 l.) and the product isolated with ether. Crystallisation of the product gave 17β-acetoxy-6α,17α-dimethyl-5α-androstan-3-one, $\gamma_{max.}^{Nujol}$ 1735, 1715 cm.$^{-1}$ A solution of the foregoing compound (4 g.) and oxalic acid (150 mg.) in methanol (60 ml.) was heated under reflux for 3 hours, cooled and the mixture treated with pyridine (4 ml.). The mixture was poured into water (600 ml.) and the product isolated with ether. Crystallisation of the product gave 17β-acetoxy-3,3-dimethoxy-6α,17α-dimethyl-5α-androstane, $\gamma_{max.}^{Nujol}$ 1735 cm.$^{-1}$ The foregoing compound (1 g.) was added to a stirred ice-cooled suspension of the Vilsmeier reagent [prepared by the addition of a solution of phosgene in ethylene dichloride (10% w./v., 7 ml.) to a solution of dimethylformamide (1.2 ml.) in ethylene dichloride (10 ml.)] and the mixture stirred at room temperature for 1 hour. The mixture was hydrolysed with aqueous methanolic sodium acetate and the product isolated with either. Crystallisation of the product gave 17β-acetoxy-2-formyl-3-methoxy-6α,17α-dimethyl-5α-androst-2-ene, $\lambda_{max.}^{EtOH}$ 279 m$\mu$ ($\epsilon$ 13,900) $\gamma_{max.}^{Nujol}$ 1735, 1650, 1610 cm.$^{-1}$

EXAMPLE 14

*Preparation of 17β-Acetoxy-2-Formyl-3-Methoxy-5α-Androst-2-Ene*

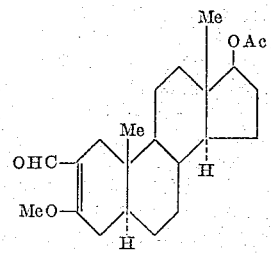

17β - Acetoxy - 3,3 - dimethoxy - 5α - androstane [10 g., M.P. 143–144° C., prepared from the corresponding 3-ketone by treatment with methanol containing a trace of oxalic acid] was added to a stirred ice-cooled suspension of the Vilsmeier reagent [prepared by the addition of a solution of phosgene in ethylene dichloride (10% w./v., 70 ml.) to a solution of dimethylformamide (15 ml.) in ethylene dichloride (75 ml.)] and the mixture stirred at room temperature for 70 minutes. The mixture was hydrolysed with aqueous methanolic sodium acetate and the product isolated with ether. Crystallisation of the product from methanol-methylene chloride gave 17β-acetoxy-2-formyl-3-methoxy-5α-androst-2-ene, M.P. 210–214° C., $\lambda_{max.}^{EtOH}$ 279 mμ (ε 13,800), $\gamma_{max.}^{Nujol}$ 1740, 1660, 1620 cm.$^{-1}$ The 2-formyl derivatives prepared in the foregoing specific examples possess claudogenic activity.

We claim:

1. A 3-enol ether having the formula

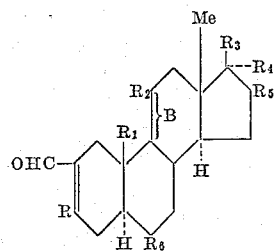

wherein

R is selected from the group consisting of O-lower alkyl and O-formoxy lower alkyl;

$R_1$ is selected from the group consisting of hydrogen and methyl $R_2$ is selected from the group consisting of hydrogen, oxo and hydroxy;

$R_3$ is selected from the group consisting of hydroxy, —COCH$_3$, —COCH$_2$F, —COCH$_2$OH and —COCH$_2$O(acetyl);

$R_4$ is selected from the group consisting of hydrogen, lower alkyl, and lower alkynyl when $R_3$ is hydroxy and is selected from the group consisting of hydrogen, hydroxy and acetoxy when $R_3$ is selected from the group consisting of —COCH$_3$, —COCH$_2$F, —COCH$_2$OH and —COCH$_2$O(acetyl);

$R_3$ and $R_4$ when taken together are selected from the group consisting of oxo and —O.CO.CH$_2$.CH$_2$———;

$R_5$ is selected from the group consisting of hydrogen, methyl, methylene and hydroxyl;

$R_6$ is selected from the group consisting of hydrogen and methyl, and

B is a single bond when $R_2$ is oxo and hydroxy and is selected from the group consisting of single and double bonds when $R_2$ is hydrogen.

2. 17α-Acetoxy-2-formyl - 3 - methoxy-5α-pregn-2-en-20-one.

3. 17β-Acetoxy-2-formyl - 3 - methoxy-17α-methyl-5α-androst-2-ene.

4. 21-Acetoxy-2-formyl-17α-hydroxy - 3 - methoxy-5α-pregn-2-ene-11,20-dione.

5. 17β-Acetoxy-2-formyl - 3 - methoxy - 19 - nor-5α-androst-2-ene.

6. 21-Acetoxy-2-formyl-17α-hydroxy - 3 - methoxy-5α-pregn-2-en-20-one.

7. 21-Acetoxy - 2 - formyl-17α-hydroxy - 3 - methoxy-16β-methyl-5α-pregn-2-en-11,20-dione.

8. 2-Formyl-17α-hydroxy - 3 - methoxy-16α-methyl-5α-pregn-2-en-11,20-dione.

9. 21-Acetoxy - 2 - formyl-17α-hydroxy - 3 - methoxy-16α-methyl-5α-pregna-2,9-(11)-dien-20-one.

10. 17β-Acetoxy-2-formyl - 3 - methoxy-16β-methyl-5α-androst-2-ene.

11. 17β-Acetoxy-2-formyl - 3 - methoxy-17α-methyl-19-nor-5α-androst-2-ene.

12. 17β-Acetoxy - 2 - formyl - 3 - methoxy-6α,17α-dimethyl-5α-androst-2-ene.

13. 17β-Acetoxy-2-formyl-3-methoxy-5α-androst-2-ene.

14. A process for the preparation of a 2(3) unsaturated 3-enol ether of a 2-formyl-3-oxo-5α-steroid selected from the group consisting of the androstane, 19-norandrostane, pregnane, 19-norpregnane, cholestane, spirostane, ergostane, and stigmastane series comprising treating a corresponding 2(3) unsaturated 3-enol ether of a 3-oxo-5α-steroid saturated in Ring A and unsubstituted at C$_2$ with the Vilsmeier reagent followed by hydrolysis.

15. A process as claimed in claim 14 wherein the 3-enol ether steroid starting material is reacted with the Vilsmeier reagent under anhydrous conditions and the resulting complex is converted into the required formyl derivative by reaction with aqueous methanolic sodium acetate.

16. A process as claimed in claim 14 wherein the Vilsmeier reagent is a complex formed from dimethyl formamide and phosgene.

17. A process as claimed in claim 14 wherein the 3-enol ether steroid starting material in dry ethylene dichloride is treated at 0° C. with a complex prepared from dimethylformamide and phosgene in dry ethylene dichloride.

18. A process as claimed in claim 14 wherein 1.0 molar proportion of the 3-enol ether steroid starting material is employed together with at least 1 molar proportion of phosgene and dimethylformamide.

19. The process of claim 14 wherein the 2(3) unsaturated 3-enol ether starting material is a 3-alkoxy-Δ$^2$-5α-steroid prepared in situ by treating a corresponding 3,3-dialkoxy-5α-steroid saturated in Ring A with the Vilsmeier reagent.

20. The process of claim 14 wherein the 2(3) unsaturated 3-enol ether starting material is a 3-hydroxyalkoxy-Δ$^2$-5α-steroid prepared in situ by treating a corresponding 3,3-alkylenedioxy-5α-steroid saturated in Ring A with the Vilsmeier reagent.

21. A process for the preparation of a 2(3) unsaturated 3-enol ether of a 2-formyl-3-oxo-5α-steroid selected from the group consisting of the androstane, 19-norandrostane, pregnane, 19-norpregnane, cholestane, spirostane, ergostane, and stigmastane series, comprising treating a corresponding 3,3-dialkoxy-5α-steroid saturated in Ring A and unsubstituted at C$_2$ with at least 2 molar equivalents of the Vilsmeier reagent followed by hydrolysis.

No references cited.

LEWIS GOTTS, *Primary Examiner.*